(12) United States Patent
Kim et al.

(10) Patent No.: US 10,384,497 B2
(45) Date of Patent: Aug. 20, 2019

(54) APPARATUS AND METHOD FOR MONITORING TIRE PRESSURE CONSIDERING LOW PRESSURE SITUATION

(71) Applicant: HYUNDAI AUTRON CO., LTD., Seongnam-si (KR)

(72) Inventors: Tae-Hun Kim, Yongin-si (KR); Tae-Rim Choi, Yongin-si (KR)

(73) Assignee: HYUNDAI AUTRON CO., LTD., Seoul (KR)

( * ) Notice: Subject to any disclaimer, the term of this patent is extended or adjusted under 35 U.S.C. 154(b) by 332 days.

(21) Appl. No.: 15/209,860

(22) Filed: Jul. 14, 2016

(65) Prior Publication Data
US 2017/0015155 A1 Jan. 19, 2017

(30) Foreign Application Priority Data

Jul. 14, 2015 (KR) ........................ 10-2015-0099790

(51) Int. Cl.
*G01M 17/02* (2006.01)
*B60C 23/06* (2006.01)
*B60C 5/00* (2006.01)

(52) U.S. Cl.
CPC ............ *B60C 23/061* (2013.01); *B60C 5/008* (2013.01); *B60T 2240/00* (2013.01);
(Continued)

(58) Field of Classification Search
CPC ...... B60C 5/008; B60C 23/061; G01M 17/02; B60T 2240/00; B60T 2240/03; B60T 2240/04; B60T 2240/07
See application file for complete search history.

(56) References Cited

U.S. PATENT DOCUMENTS 5,721,374 A * 2/1998 Siekkinen ............. B60C 23/061
340/442
5,939,626 A * 8/1999 Tominaga ............. B60C 23/061
340/444

(Continued)

FOREIGN PATENT DOCUMENTS

| JP | 63305011 A | 12/1988 |
| JP | 2005-008094 A | 1/2005 |
| JP | 2009-006793 A | 1/2009 |

OTHER PUBLICATIONS

Korean Intellectual Property Office, Office Action for Korean patent application No. 10-2015-0099790, dated Jul. 21, 2016, Korea.

*Primary Examiner* — Sujoy K Kundu
*Assistant Examiner* — Lynda Dinh
(74) *Attorney, Agent, or Firm* — Baker & Hostetler LLP; Hyunho Park (57) ABSTRACT

The present invention relates to an apparatus and a method for monitoring a tire pressure considering a low pressure situation. Provided is a tire pressure monitoring apparatus considering a low pressure situation including: a radius analyzing unit which calculates a radius analysis value using a relative velocity difference and an average velocity calculated from wheel velocities of the wheels mounted on the vehicle; a critical value setting unit which compares the calculated radius analysis value with a predetermined determination reference value and sets different critical values in accordance with the comparison result; and a low pressure determining unit which determines a low pressure of a tire mounted on a vehicle using the set critical value.

14 Claims, 6 Drawing Sheets

(52) U.S. Cl.
    CPC ....... *B60T 2240/04* (2013.01); *B60T 2240/07* (2013.01); *G01M 17/02* (2013.01)

(56) References Cited

U.S. PATENT DOCUMENTS

| | | | |
|---|---|---|---|
| 2007/0139179 A1* | 6/2007 | Yanase .................. | B60C 23/061 340/443 |
| 2014/0053625 A1* | 2/2014 | Wada ...................... | G01L 27/00 73/1.66 |
| 2015/0298513 A1* | 10/2015 | Taki ...................... | B60C 23/061 73/146.2 |

* cited by examiner

| POSITION OF LOW PRESSURE WHEEL | DEL_FR | DEL_LR | DEL_DIAG |
|---|---|---|---|
| FL | 1 | 1 | 1 |
| FR | 1 | -1 | -1 |
| RL | -1 | 1 | -1 |
| RR | -1 | -1 | 1 |
| FL-FR | 1 | 0 | 0 |
| RL-RR | -1 | 0 | 0 |
| FL-RL | 0 | 1 | 0 |
| FR-RR | 0 | -1 | 0 |
| FL-RR | 0 | 0 | 1 |
| FR-RL | 0 | 0 | -1 |
| FL-FR-RL | 1 | 1 | -1 |
| FL-FR-RR | 1 | -1 | 1 |
| FL-RL-RR | -1 | 1 | 1 |
| FR-RL-RR | -1 | -1 | -1 |

FIG.5

| POSITION OF LOW PRESSURE WHEEL | DEL_FR | DEL_LR | DEL_DIAG |
|---|---|---|---|
| FL | 1 | 1 | 1 |
| FR | 1 | -1 | -1 |
| RL | -1 | 1 | -1 |
| RR | -1 | -1 | 1 |
| FL-FR | 1 | 0 | 0 |
| RL-RR | -1 | 0 | 0 |
| FL-RL | 0 | 1 | 0 |
| FR-RR | 1 | -1 | -1 |
| FL-RR | 0 | 0 | 1 |
| FR-RL | 0 | 0 | -1 |
| FL-FR-RL | 1 | 1 | -1 |
| FL-FR-RR | 1 | -1 | 1 |
| FL-RL-RR | -1 | 1 | 1 |
| FR-RL-RR | -1 | -1 | -1 |

FIG.6

APPARATUS AND METHOD FOR MONITORING TIRE PRESSURE CONSIDERING LOW PRESSURE SITUATION

CROSS-REFERENCE TO RELATED APPLICATIONS

This application claims priority to and the benefit of Korean Patent Application No. 10-2015-0099790 filed in the Korean Intellectual Property Office on Jul. 14, 2015, the entire contents of which are incorporated herein by reference.

TECHNICAL FIELD

The present invention relates to an apparatus and a method for monitoring a tire pressure, and more particularly, to an apparatus and a method for monitoring a tire pressure considering a low pressure situation which may more precisely determine a low pressure of a tire mounted on a vehicle considering a low pressure situation.

BACKGROUND ART

Air pressure of a tire is one of the elements that allow a vehicle to safely travel. When the air pressure of the tire is low, a vehicle easily slides which may result in a big accident. Further, fuel consumption is increased, so that fuel efficiency is lowered. Further, the life-span of the tire is shortened and ride comfort and braking force significantly deteriorate. When the air pressure of the tire decreases, functional problems including deterioration of fuel efficiency, tire wear, and the like may occur. In addition, when the decrease in air pressure is significant, there is a possibility that vehicle damage and danger to human life such as an accident occurrence caused by a driving inoperability state or tire rupture will occur.

However, since most drivers cannot recognize a change in air pressure of the tire, a tire pressure monitoring system (TPMS) which is a tire pressure monitoring system announcing the change in pressure of the tire to the drivers in real time has been developed.

In recent years, the tire pressure monitoring system (TPMS) is mounted on a vehicle, which detects the decrease in air pressure of the tire mounted on the vehicle and announces the detected decrease in air pressure to the driver.

The tire pressure monitoring system (TPMS) announces the decrease in pressure of the tire to the driver to allow the driver to check a pressure state of the tire, thereby solving the problem.

The TPMS may be generally classified into a direct scheme and an indirect scheme.

The direct scheme of TPMS installs a pressure sensor in a tire wheel to directly measure the air pressure of the tire. The direct scheme of TPMS announces the change in air pressure of the tire, which is measured from the pressure sensor attached to the tire to the driver.

The direct scheme of TPMS may accurately sense the air pressure of the tire, but the life-span of a battery is limited and whenever the tire is replaced, the direct scheme of TPMS needs to be installed again. In the direct scheme of TPMS, since a pressure sensor is attached, imbalance of the tire may occur and problems including radio frequency interference and the like may occur. Further, since the direct scheme of TPMS is a scheme that mounts the sensor on the tire to measure the air pressure, the indirect scheme of TPMS has an advantage in that the direct scheme of TPMS measure accurate pressure. On the contrary, the direct scheme of TPMS is constituted by various components including a pressure measurement sensor mounted on the tire, a wireless communication unit for transmitting a measurement value in a general wireless scheme, and the like. Therefore, the direct scheme of TPMS is more expensive and further, higher in failure rate than the indirect scheme of TPMS.

Meanwhile, the indirect scheme of tire pressure monitoring system is a scheme that estimates a loss in air pressure by using a wheel velocity sensor which is mounted on the vehicle to measure a wheel velocity. In the indirect scheme of TPMS, since the TPMS may be implemented only by an algorithm, additional hardware is not required, which results in reduced cost. Further, just a little maintenance cost is consumed. The indirect scheme of TPMS has higher price competitiveness than the direct scheme of TPMS.

The indirect scheme of TPMS indirectly estimates the change of the air pressure of the tire through change of a response characteristic (for example, a rotation velocity or a frequency characteristic of the rotation velocity) of the tire generated when the air pressure is lowered and announces the estimation to the driver. The direct scheme of TPMS may precisely detect the lowering of the air pressure of the tire, but an exclusive wheel is required therefor and performance is not good in an actual environment. Therefore, it has disadvantages in view of a technology and cost.

However, since the resonance frequency of the indirect scheme of TPMS varies depending on the wheel velocity, accuracy of the indirect scheme of TPMS slightly deteriorates. Since the estimated change in air pressure of the tire may be different from an actual change, the indirect scheme TPMS may send a false alarm to the driver.

The indirect scheme of TPMS estimates an air pressure of a tire from rotation information of the tire. The indirect scheme of TPMS may be, in detail, classified into a dynamic loaded radius (DLR) analysis scheme and a resonance frequency method (RFM) analysis scheme again. They may be briefly called a radius analysis scheme and a frequency analysis scheme. They may be briefly called a radius analysis scheme and a frequency analysis scheme.

In a frequency analysis scheme, when the air pressure of the tire decreases, a difference from a tire having a normal air pressure is detected by using that a frequency characteristic of a rotational velocity signal of a wheel is changed. In the frequency analysis scheme, based on a resonance frequency which may be acquired by frequency analysis of the rotational velocity signal of the wheel, when the relevant resonance frequency is calculated to be lower than a reference frequency estimated while initializing, it is determined that the air pressure of the tire decreases.

In a radius analysis scheme, by using a phenomenon in which a dynamic loaded radius of the depressurized tire decreases while driving, and as a result, the tire rotates more rapidly than the normal tire, the pressure decrease is detected by comparing rotational velocities of four tires. In the radius analysis scheme of the tire pressure monitoring system, since it is determined whether the tire is depressurized based on a wheel velocity, the wheel velocity exerts a largest influence on the determination of the depressurization.

In the meantime, when the low pressure of the tire is estimated using a dynamic radius analysis technique, in the tire pressure monitoring system considering a low pressure situation, the estimated value may be influenced in accordance with a low pressure situation of the tire. For example, in case when one tire is at a low pressure and in case when two tires are at a low pressure, a changed amount of the radius analysis value is different. In this case, in accordance with a disturbance or a road condition, the changed amount of the radius analysis value may be significant in accordance with the low pressure situation of the tire. Since the estimated change in air pressure of the tire may be different from an actual change, the indirect scheme of TPMS may send a false alarm to the driver.

Therefore, a technique which more precisely monitors the pressure of the tire by compensating a dynamic radius analysis value in accordance with the low pressure situation of the tire in accordance with a mass of a vehicle is required.

SUMMARY OF THE INVENTION

The present invention has been made in an effort to provide an apparatus and a method for monitoring a tire pressure considering a low pressure situation which may more precisely determine a low pressure of a tire mounted on a vehicle considering a low pressure situation by setting different critical values depending on a low pressure situation (for example, one, two, or three wheels are at a low pressure situation) and determining the low pressure depending on the set critical value.

The present invention has been made in an effort to provide an apparatus and a method for monitoring a tire pressure considering a low pressure situation which determines a low pressure by distinguishing a critical value for a situation when one and three wheels are at a low pressure and a critical value for a situation when two wheels are at a low pressure, thereby reducing false alarm or erroneous alarm and increasing reliability of detecting a low pressure.

A first aspect of the present invention provides a tire pressure monitoring apparatus considering a low pressure situation. The apparatus includes a radius analyzing unit which calculates a radius analysis value using a relative velocity difference and an average velocity calculated from wheel velocities of the wheels mounted on the vehicle; a critical value setting unit which compares the calculated radius analysis value with a predetermined determination reference value and sets different critical values in accordance with the comparison result; and a low pressure determining unit which determines a low pressure of a tire mounted on a vehicle using the set critical value.

The apparatus may further include a data storing unit which stores data regarding determining a low pressure of the tire mounted on the vehicle and stores a radius analysis value, a predetermined determination reference value, and the set critical value.

The critical value setting unit may calculate an analysis sum of some radius analysis values among the calculated radius analysis values and compare the calculated analysis sum and a predetermined determination reference value to set different critical values.

The critical value setting unit may calculate an analysis sum of remaining two radius analysis values excluding values having the largest absolute value, among the calculated radius analysis values and compares the calculated analysis sum and a predetermined determination reference value to set different critical values.

When the calculated analysis sum is smaller than the predetermined determination reference value, the critical value setting unit may set the radius analysis value as a first critical value and when the calculated analysis sum is equal to or larger than the predetermined determination reference value, the critical value setting unit may set the radius analysis value as a second critical value, and the first critical value is larger than the second critical value.

The critical value setting unit may compare whether the calculated radius analysis value is larger than a radius analysis value when one wheel and three wheels are at a low pressure changing when one wheel and three wheels are at a low pressure, when the calculated radius analysis value is smaller than the radius analysis value when one wheel and three wheels are at a low pressure, the critical value setting unit may set the radius analysis value as a first critical value. When the calculated radius analysis value is equal to or larger than the radius analysis value when one wheel and three wheels are at a low pressure, the critical value setting unit may set the radius analysis value as a second critical value, and the first critical value is larger than the second critical value.

The low pressure determining unit may compare the calculated radius analysis value and the set critical value to change the calculated radius analysis value to a logic value for dynamic radius analysis.

When the calculated radius analysis value exceeds the set critical value, the low pressure determining unit may change the radius analysis value to a positive logic value and when the calculated radius analysis value is smaller than a negative value of the set critical value, the low pressure determining unit may change the radius analysis value to a negative logic value, and when an absolute value of the calculated radius analysis value is smaller than the set critical value, the low pressure determining unit may change the radius analysis value to a logic value "0".

A second aspect of the present invention provides a tire pressure monitoring method considering a low pressure situation. The method includes calculating a radius analysis value using a relative velocity difference and an average velocity calculated from wheel velocities of the wheels mounted on the vehicle; comparing the calculated radius analysis value with a predetermined determination reference value and setting different critical values in accordance with the comparison result; and determining a low pressure of a tire mounted on a vehicle using the set critical value.

In the setting of a critical value, an analysis sum of some radius analysis values among the calculated radius analysis values may be calculated and the calculated analysis sum and a predetermined determination reference value may be compared to set different critical values.

In the setting of a critical value, an analysis sum of remaining two radius analysis values excluding values having the largest absolute value among the calculated radius analysis values may be calculated and the calculated analysis sum and a predetermined determination reference value are compared to set different critical values.

The setting of a critical value may include; comparing the calculated radius analysis value with a predetermined determination reference value; and setting the radius analysis value as a first critical value when the calculated analysis sum is smaller than the predetermined determination reference value; and setting the radius analysis value as a second critical value when the calculated analysis sum is equal to or larger than the predetermined determination reference value. In this case, the first critical value may be larger than the second critical value The setting of a critical value may include: comparing whether the calculated radius analysis value is larger than a radius analysis value when one wheel and three wheels are at a low pressure changing when one wheel and three wheels are at a low pressure; setting the radius analysis value as a first critical value when the calculated radius analysis value is smaller than the radius analysis value when one wheel and three wheels are at a low pressure; and setting the radius analysis value as a second critical value when the calculated radius analysis value is equal to or larger than the radius analysis value when one wheel and three wheels are at a low pressure. In this case, the first critical value may be larger than the second critical value.

In the determining of a low pressure, the calculated radius analysis value and the set critical value may be compared to change the calculated radius analysis value to a logic value for dynamic radius analysis.

The determining of a low pressure may include: comparing the calculated radius analysis value with the set critical value; changing the radius analysis value to a positive logic value when the calculated radius analysis value exceeds the set critical value; changing the radius analysis value to negative logic value when the calculated radius analysis value is smaller than a negative value of the set critical value; and changing the radius analysis value to a logic value "0" when an absolute value of the calculated radius analysis value is smaller than the set critical value.

According to exemplary embodiments of the present invention, different critical values are set depending on a low pressure situation (for example, one or two wheels are at a low pressure situation) and the low pressure is determined in accordance with the set critical value to precisely determine a low pressure of a tire mounted on a vehicle in accordance with a low pressure situation.

According to the exemplary embodiments of the present invention, the lower pressure is determined by distinguishing a critical value for a situation when one and three wheels are at a low pressure and a critical value for a situation when two wheels are at a low pressure, thereby reducing false alarm or erroneous alarm and increasing reliability of detecting a low pressure.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings.

When the exemplary embodiment is described, a technology which is well known in the technical field of the present invention and is not directly related with the present invention will not be described. The reason is that unnecessary description is omitted to clearly transmit the gist of the present invention without obscuring the gist of the present invention.

By the same reason, in the accompanying drawings, some parts are exaggerated, omitted, or schematically illustrated. Further, an actual size is not fully reflected to the size of each component. In the drawings, like reference numerals denote like or corresponding components.

Figure 1:
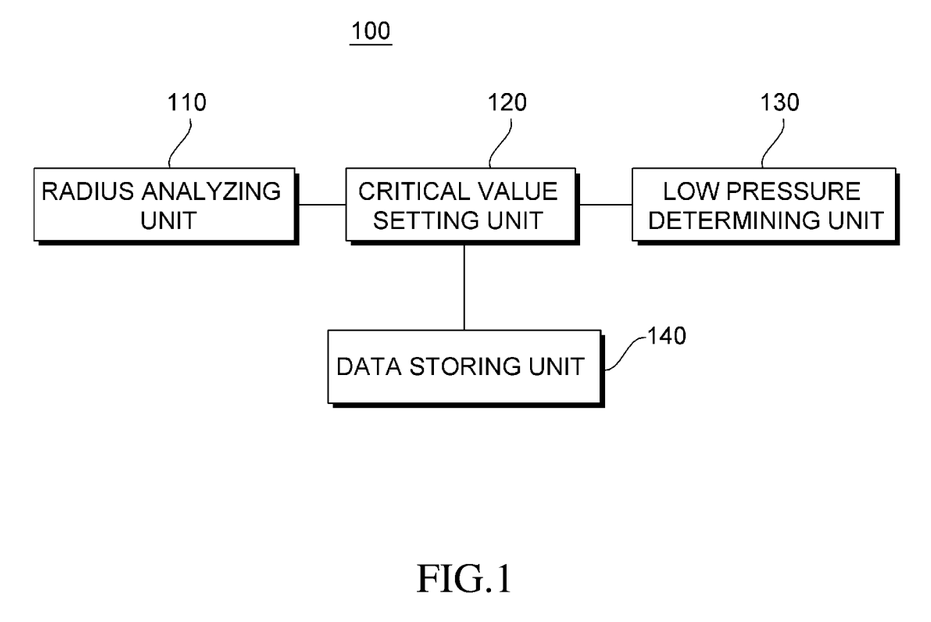
FIG. 1 is a configuration view of a tire pressure monitoring apparatus considering a low pressure situation according to an exemplary embodiment of the present invention.

FIG. 1 is a configuration view of a tire pressure monitoring apparatus considering a low pressure situation according to an exemplary embodiment of the present invention.

As illustrated in FIG. 1, a tire pressure monitoring apparatus 100 according to an exemplary embodiment of the present invention includes a radius analyzing unit 110, a critical value setting unit 120, a low pressure determining unit 130, and a data storing unit 140.

Hereinafter, specific configuration and operation of components of a tire pressure monitoring apparatus considering a low pressure situation of FIG. 1 will be described.

First, the radius analyzing unit 110 receives a wheel velocity of a wheel from a wheel velocity sensor (not illustrated) provided in the vehicle. In the vehicle, four wheels including a front left wheel FL, a front right wheel FR, a rear left wheel RL, and a rear right wheel RR are mounted. The wheel velocity sensor detects rotation velocities of the front left wheel FL, the front right wheel FR, the rear left wheel RL, and the rear right wheel RR. For example, the wheel velocity sensor may be a wheel velocity sensor which generates a rotation pulse using an electromagnetic pickup and measures a rotational angular velocity and a wheel velocity from a pulse number. In the meantime, the wheel velocity sensor may be an angular velocity sensor. Information on the rotation velocity of the wheel measured by the wheel velocity sensor is transmitted to the radius analyzing unit 110.

The radius analyzing unit 110 calculates a radius analysis value using a relative velocity difference and an average velocity calculated from wheel velocities of the wheels mounted on the vehicle. Here, the radius analysis is performed by determining whether a pressure of the tire is reduced by comparing the rotation velocities of the wheel. Therefore, the radius analysis may be performed by comparing the rotation velocities of the wheels using various methods. In this exemplary embodiment, the radius analysis value is calculated by the following method.

When it is assumed that wheel rotation velocities are $V_{\Phi A}$, $V_{\Phi P}$, $V_{PA}$, and $V_{PP}$ for the front left wheel FL, the front right wheel FR, the rear left wheel RL, and the rear right wheel RR, the average velocity $V_M$ of four wheels is calculated by the following Equation 1.

$$V_M = \frac{(V_{FL} + V_{FR} + V_{RL} + V_{RR})}{4} \qquad \text{Equation 1}$$

Here, $V_{\Phi\Lambda}$, $Vq_{\Phi P}$, $V_{P\Lambda}$, and $V_{PP}$ represent wheel velocities of the front left wheel FL, the front right wheel FR, the rear left wheel RL, and the rear right wheel RR, respectively, and $V_M$ represents an average velocity of four wheels.

The radius analyzing unit 110 calculates the radius analysis values DEL_FR, DEL_LR, and DEL_DIAG, as represented in the following Equations 2 to 4, using the wheel velocities $V_{\Phi\Lambda}$, $V_{\Phi P}$, $V_{P\Lambda}$, and $V_{PP}$ of the front left wheel FL, the front right wheel FR, the rear left wheel RL, and the rear right wheel RR and the average velocity $V_M$ of four wheels.

$$\text{DEL\_FR} = \frac{\frac{V_{FL} + V_{FR}}{2} - \frac{V_{RL} + V_{RR}}{2}}{V_M} \qquad \text{Equation 2}$$

Here, DEL_FR is a radius analysis value of the front and rear wheels, $V_{XX}$ is a wheel velocity of XX wheel, and $V_M$ is an average velocity of four wheels.

$$\text{DEL\_LR} = \frac{\frac{V_{FL} + V_{RL}}{2} - \frac{V_{FR} + V_{RR}}{2}}{V_M} \qquad \text{Equation 3}$$

Here, DEL_LR is a radius analysis value of the left and right wheels, $V_{XX}$ is a wheel velocity of XX wheel, and $V_M$ is an average velocity of four wheels.

$$\text{DEL\_DIAG} = \frac{\frac{V_{FL} + V_{RR}}{2} - \frac{V_{FR} + V_{RL}}{2}}{V_M} \qquad \text{Equation 4}$$

Here, DEL_DIAG is a radius analysis value of the wheels in a diagonal direction, $V_{XX}$ is a wheel velocity of XX wheel, and $V_M$ is an average velocity of four wheels.

The critical value setting unit 120 compares a radius analysis value calculated in the radius analyzing unit 110 with a predetermined determination reference value. The critical value setting unit 120 sets different critical values in accordance with a comparison result.

Specifically, the critical value setting unit 120 calculates an analysis sum of some radius analysis values among calculated radius analysis values.

For example, the critical value setting unit 120 compares the calculated analysis sum and a predetermined determination reference value to set different critical values. Here, the predetermined determination reference value is stored in the data storing unit 160 as a reference value for determining first and second critical values.

Here, the critical value setting unit 120 calculates an analysis sum of the remaining two radius analysis values excluding a value having a largest absolute value among radius analysis values calculated in the radius analyzing unit 110.

The critical value setting unit 120 compares the calculated analysis sum and a predetermined determination reference value to set different critical values.

Thereafter, when the calculated analysis sum is smaller than the predetermined determination reference value, the critical value setting unit 120 may set the calculated analysis sum as a first critical value.

When the calculated analysis sum is equal to or larger than the predetermined determination reference value, the critical value setting unit 120 may set the calculated analysis sum as a second critical value.

Here, the first critical value is larger than the second critical value.

As another exemplary embodiment, the critical value setting unit 120 may compare whether the radius analysis value calculated in the radius analyzing unit 110 is large than a radius analysis value when one wheel and three wheels are at a low pressure. Here, the radius analysis value when one wheel and three wheels are at a low pressure indicates a value changing when one wheel and three wheels are at a low pressure.

When the radius analysis value calculated in the radius analyzing unit 110 is smaller than a radius analysis value when one wheel and three wheels are at a low pressure, the critical value setting unit 120 sets the radius analysis value as a first critical value.

When the radius analysis value calculated in the radius analyzing unit 110 is equal to or larger than a radius analysis value when one wheel and three wheels are at a low pressure, the critical value setting unit 120 sets the radius analysis value as a second critical value.

Here, the first critical value is larger than the second critical value.

The low pressure determining unit 130 determines the low pressure of the tire mounted on the vehicle using the critical value set in the critical value setting unit 120.

Specifically, the low pressure determining unit 130 compares the radius analysis value calculated in the radius analyzing unit 110 with the critical value set in the critical value setting unit 120 to change the radius analysis value calculated in the radius analyzing unit 110 as a logic value for dynamic radius analysis.

The radius analysis value calculated in the radius analyzing unit 110 may be changed into logic values in accordance with a comparison result with the critical value, in the following three cases.

First, when the radius analysis value calculated in the radius analyzing unit 110 exceeds the critical value set in the critical value setting unit 120, the low pressure determining unit 130 changes the radius analysis value to a positive logic value. For example, when the radius analysis value calculated in the radius analyzing unit 110 exceeds the critical value set in the critical value setting unit 120, the low pressure determining unit 130 changes the radius analysis value to a logic value, 1.

First, when the radius analysis value calculated in the radius analyzing unit 110 is smaller than a negative value of the critical value set in the critical value setting unit 120, the low pressure determining unit 130 changes the radius analysis value to a negative logic value. For example, when the radius analysis value calculated in the radius analyzing unit 110 is smaller than a negative value of the critical value set in the critical value setting unit 120, the low pressure determining unit 130 changes the radius analysis value to a logic value, −1.

Third, when an absolute value of the radius analysis value calculated in the radius analyzing unit 110 is smaller than the critical value set in the critical value setting unit 120, the low pressure determining unit 130 changes the radius analysis value to a logic value, 0.

In the meantime, the data storing unit 140 stores data regarding determining a low pressure of the tire mounted on the vehicle.

The data storing unit 140 stores a radius analysis value, a predetermined determination reference value, and a set critical value.

Figure 2:
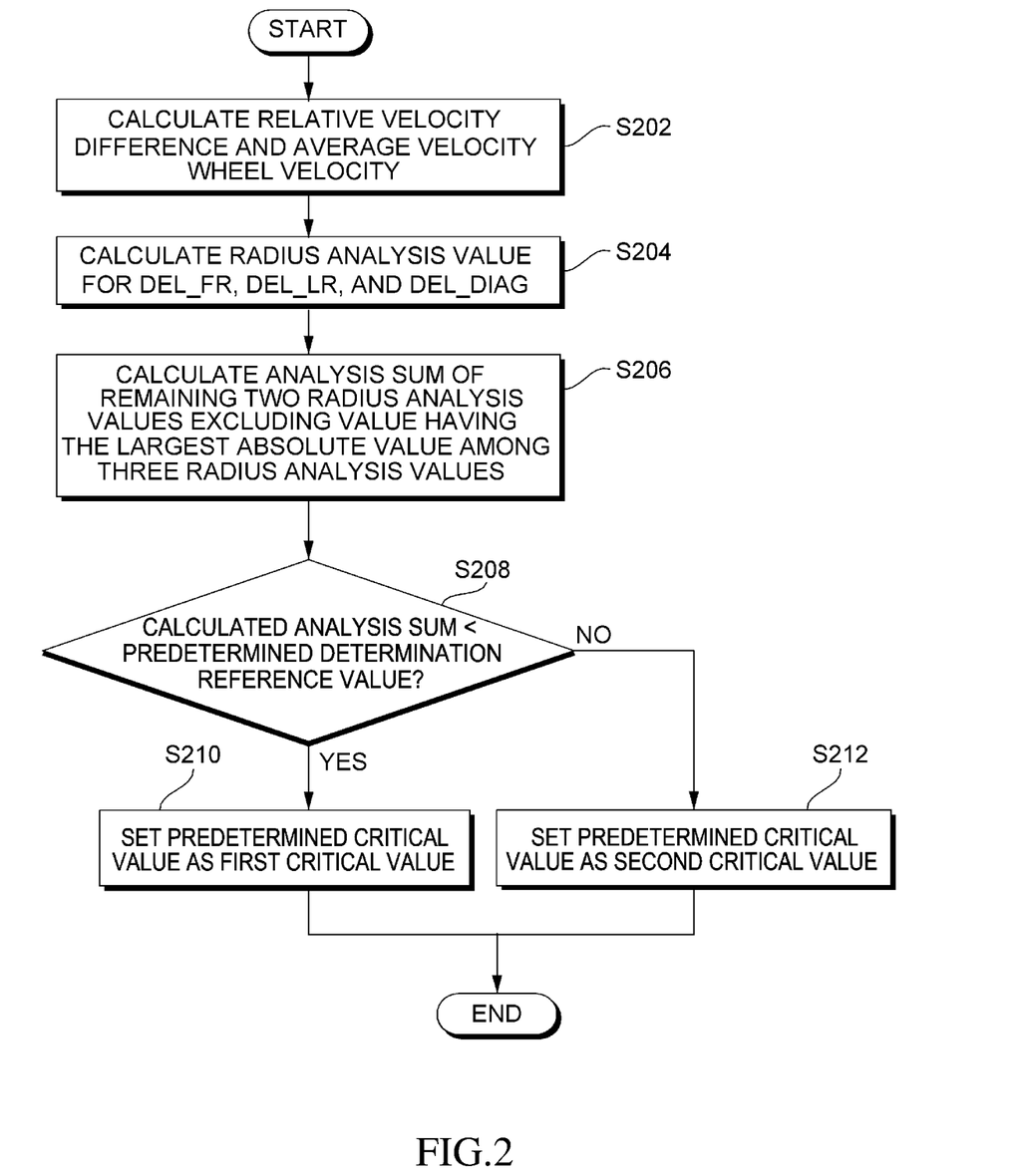
FIG. 2 is a flow chart of a critical value setting method considering a low pressure situation according to an exemplary embodiment of the present invention.

FIG. 2 is a flow chart of a critical value setting method considering a low pressure situation according to an exemplary embodiment of the present invention.

The radius analyzing unit 110 calculates a relative velocity difference and an average velocity from a wheel velocity in step S202.

The radius analyzing unit 110 calculates radius analysis values for a front and rear radius analysis value DEL_FR, a left and right radius analysis value DEL_LR, a diagonal radius analysis value DEL_DIAG based on the calculated relative velocity difference and the average velocity in step S204.

Next, the critical value setting unit 120 calculates an analysis sum of remaining two radius analysis values excluding a value having the largest absolute value, among three radius analysis values in step S206.

Next, the critical value setting unit 120 compares the radius analysis value calculated in the radius analyzing unit 110 with a predetermined determination reference value and checks whether the calculated analysis sum is smaller than the predetermined determination reference value in step S208.

As a result of checking in step S208, when the calculated analysis sum is smaller than the predetermined determination reference value, the critical value setting unit 120 may set the calculated analysis sum as a first critical value in step S210.

In contrast, as a result of checking in step S208, when the calculated analysis sum is equal to or larger than the predetermined determination reference value, the critical value setting unit 120 may set the calculated analysis sum as a second critical value in step S212.

Here, the first critical value is larger than the second critical value.

Figure 3:
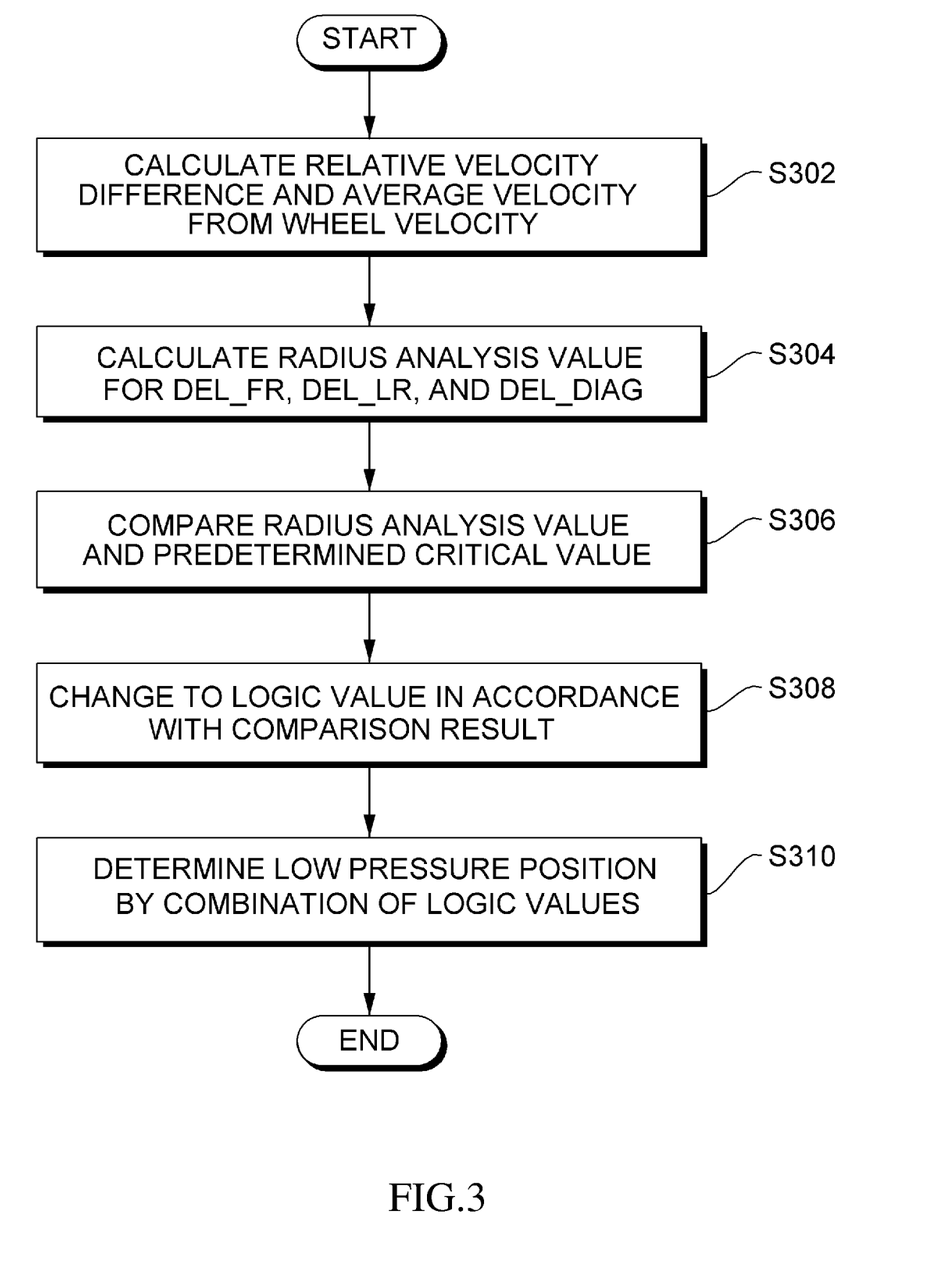
FIG. 3 is a flow chart of a tire pressure monitoring method considering a low pressure situation according to an exemplary embodiment of the present invention.

FIG. 3 is a flow chart of a tire pressure monitoring method considering a low pressure situation according to an exemplary embodiment of the present invention.

The radius analyzing unit 110 calculates a relative velocity difference and an average velocity from a wheel velocity in step S302.

The radius analyzing unit 110 calculates radius analysis values for a front and rear radius analysis value DEL_FR, a left and right radius analysis value DEL_LR, a diagonal radius analysis value DEL_DIAG based on the calculated relative velocity difference and the average velocity in step S304.

Next, the low pressure determining unit 130 compares the radius analysis value calculated in the radius analyzing unit 110 with a critical value predetermined in the critical value setting unit 120 in step S306.

The low pressure determining unit 130 changes the radius analysis value calculated in the radius analyzing unit 110 to a logic value for dynamic radius analysis in step S308.

The low pressure determining unit 130 determines a position of a low pressure of the tire using a combination of changed logic values in step S310.

Figure 4:
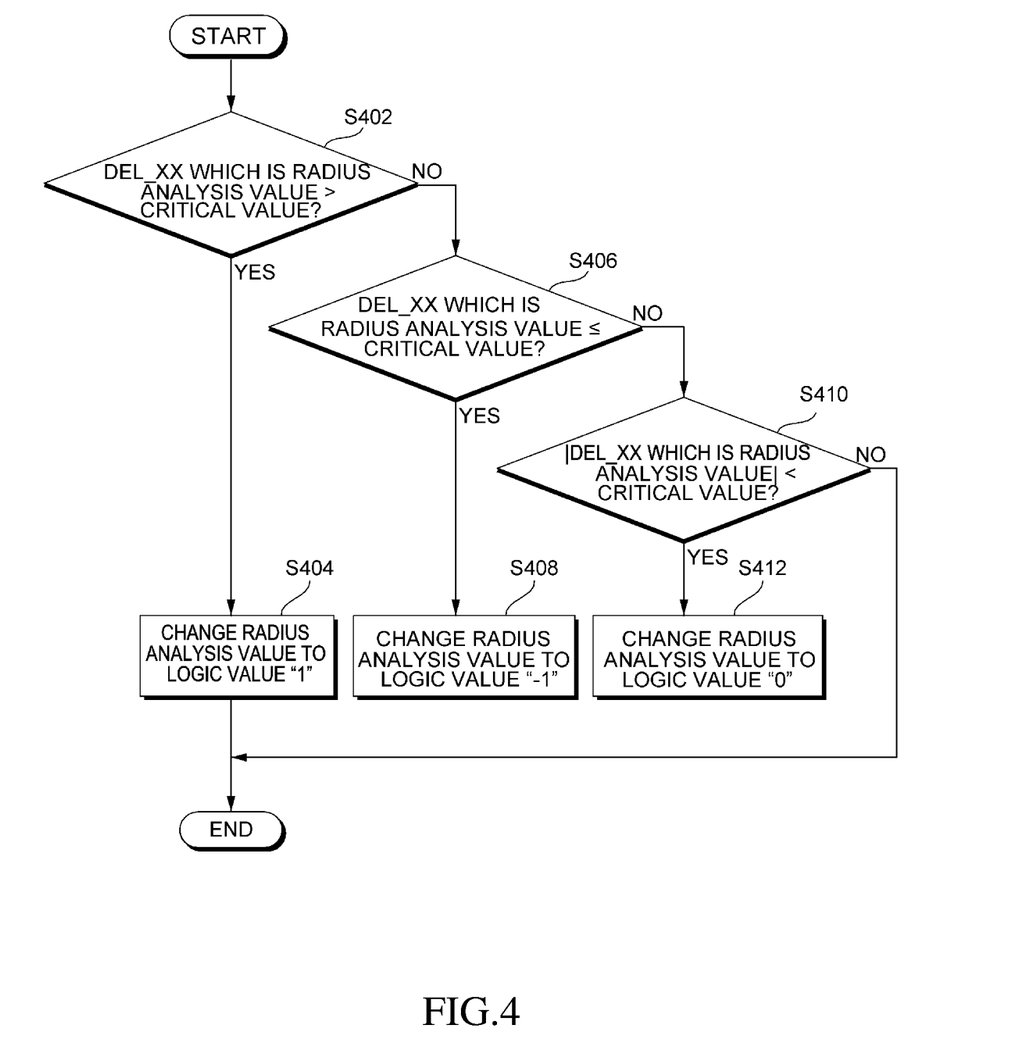
FIG. 4 is a flow chart of a logic value changing method of a radius analysis value according to an exemplary embodiment of the present invention.

FIG. 4 is a flow chart of a logic value changing method of a radius analysis value according to an exemplary embodiment of the present invention.

The radius analyzing unit 110 calculates relative velocity difference and average velocity from the wheel velocities, and calculates radius analysis values for a front and rear radius analysis value DEL_FR, a left and right radius analysis value DEL_LR, a diagonal radius analysis value DEL_DIAG based on the calculated relative velocity difference and average velocity.

Next, the radius analysis value calculated in the radius analyzing unit 110 may be changed into a logic value in accordance with a comparison result with the critical value, in the following three cases.

After setting the critical value by the critical value setting unit 120, the low pressure determining unit 130 checks whether a DEL_XX value which is a radius analysis value calculated in the radius analyzing unit 110 exceeds the predetermined critical value in step S402. Here, DEL_XX may be the front and rear radius analysis value DEL_FR, the left and right radius analysis value DEL_LR, a diagonal radius analysis value DEL_DIAG for a combination of a front left wheel FL, a front right wheel FR, a rear left wheel RL, and a rear right wheel RR.

As a result of checking in step S402, when the DEL_XX value which is the calculated radius analysis value exceeds the predetermined critical value, that is, a critical value set in the critical value setting unit 120, the low pressure determining unit 130 changes the radius analysis value calculated in the radius analyzing unit 110 to a positive logic value (for example, a logic value "1") having a positive sign in step S404.

In contrast, as a result of checking in step S402, when the DEL_XX value which is the calculated radius analysis value does not exceed the predetermined critical value, that is, smaller than the predetermined critical value, the low pressure determining unit 130 checks whether the DEL_XX value which is the radius analysis value calculated in the radius analyzing unit 110 is smaller than a negative critical value having a negative sign of the predetermined critical value in step S406.

As a result of checking in step S406, when the DEL_XX value which is the calculated radius analysis value is smaller than a negative critical value which has a negative signal of the predetermined critical value, the low pressure determining unit 130 changes the radius analysis value calculated in the radius analyzing unit 110 to a negative logic value (for example, a logic value "−1") having a negative sign in step S408.

In contrast, as a result of checking in step S406, when the DEL_XX value which is the calculated radius analysis value does not exceed the predetermined critical value, that is, smaller than the predetermined critical value, the low pressure determining unit 130 checks whether the an absolute value |DEL_XX value which is the radius analysis value| of the radius analysis value calculated in the radius analyzing unit 110 is smaller than a critical value set in the critical value setting unit 120 of the predetermined critical value in step S410.

As a result of checking in step S410, when the absolute value (|DEL_XX value which is the radius analysis value|) of the calculated radius analysis value is smaller than the critical value set in the critical value setting unit 120, the low pressure determining unit 130 changes the radius analysis value calculated in the radius analyzing unit 110 to a logic value "0" in step S412. As a result of checking in step S410, when the absolute value (|DEL_XX value which is the radius analysis value|) of the calculated radius analysis value is not smaller than the critical value set in the critical value setting unit 120, the case corresponds to the above-described steps S404 and S408, so that the process of changing the radius analysis value into the logic value ends.

As an example of the front and rear radius analysis value DEL_FR, the low pressure determining unit 150 compares the DEL_XX value which is a radius analysis value calculated in the radius analyzing unit 110 with a predetermined threshold or a critical value having a negative sign. When the front and rear radius analysis value DEL_FR is larger than a critical value, the radius analysis value is changed to a logic value "1". When the front and rear radius analysis value DEL_FR is smaller than the critical value, the radius analysis value is changed to a logic value, "−1". Further, |DEL_FR|<critical value, the radius analysis value is changed to a logic value, "0".

Figure 5:
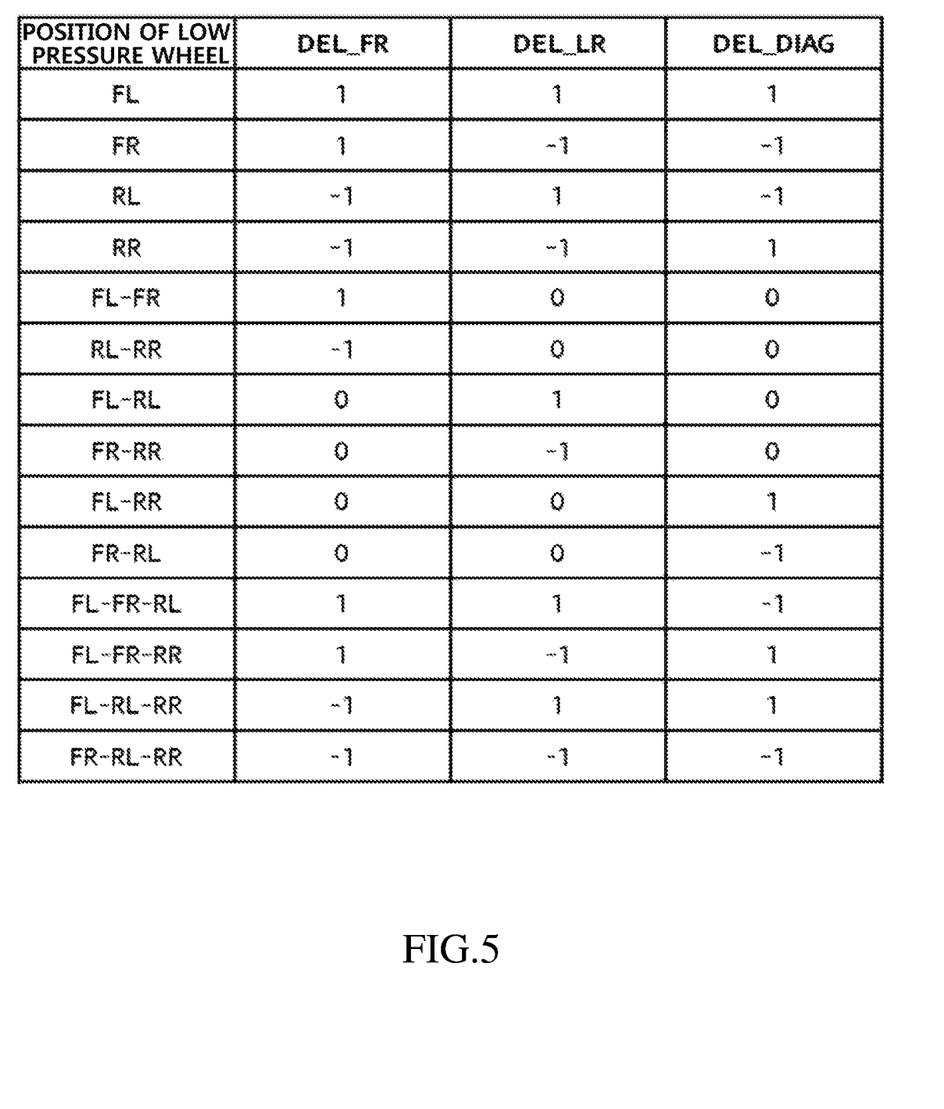
FIG. 5 is an explanatory view of a logic combining equation using a radius analysis value according to an exemplary embodiment of the present invention.

FIG. 5 is an explanatory view of a logic combining equation using a radius analysis value according to an exemplary embodiment of the present invention.

The low pressure determining unit 130 determines a low pressure in accordance with a logic value of the radius analysis value illustrated in FIG. 5.

For example, when the front left wheel FL is in a low pressure state (a location of a low pressure wheel is FL), the dynamic load radius is reduced. By doing this, a wheel velocity of the front left wheel FL is faster than wheel velocities of the remaining three wheels, that is, the front right wheel FR, a rear left wheel RL, and a rear right wheel RR.

Therefore, all the front and rear radius analysis value DEL_FR, the left and right radius analysis value DEL_LR, and the diagonal radius analysis value DEL_DIAG have positive values.

In this case, when the front and rear radius analysis value DEL_FR, the left and right radius analysis value DEL_LR, and the diagonal radius analysis value DEL_DIAG which have positive signs are larger than the critical value, all the logic values are "1".

A logic combining equation for the remaining wheels in accordance with a low pressure situation is illustrated in FIG. 5. The logic combining equation for wheels in accordance with the low situation is stored in the data storing unit 140.

Figure 6:
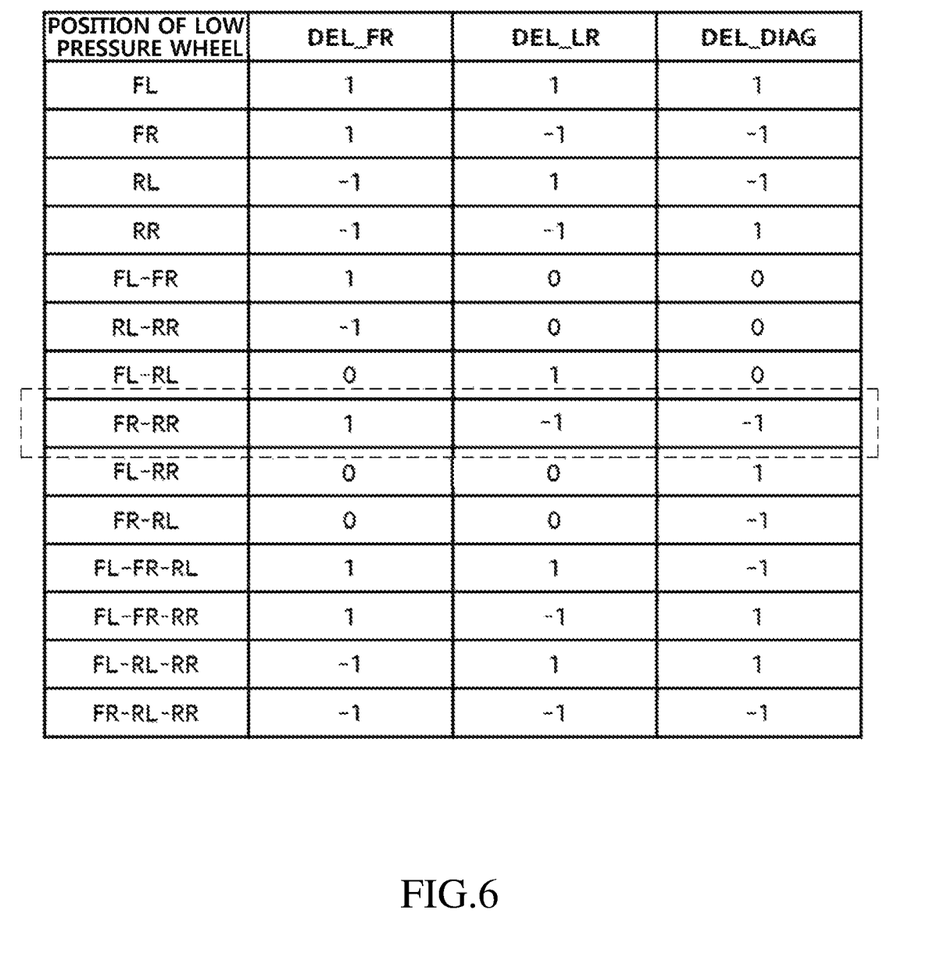
FIG. 6 is an explanatory view of an erroneous situation of a logic combining equation using a radius analysis value according to an exemplary embodiment of the present invention.

FIG. 6 is an explanatory view of an erroneous situation of a logic combining equation using a radius analysis value according to an exemplary embodiment of the present invention.

In contrast to FIG. 5, an error situation of the logic combining equation will be described with reference to FIG. 6.

For example, when the front right wheel FR and the rear right wheel RR are in a low pressure state (a location of a low pressure wheel is FR-RR), the dynamic load radius is reduced. By doing this, the wheel velocities of the front right wheel FR and the rear right wheel RR are higher than the wheel velocity of the remaining two front left wheel FL and rear left wheel RL.

Therefore, when the logic combining equation is normal, the front and rear radius analysis value DEL_FR and the diagonal radius analysis value DEL_DIAG have a logic value "0" and the left and right radius analysis value DEL_LR needs to have a logic value "−1".

However, as represented by a dotted line in FIG. 6, when an error is incurred in the logic combining equation, the front and rear radius analysis value DEL_FR has a logic value "1" and the diagonal radius analysis value DEL_DIAG and the left and right radius analysis value DEL_LR have a logic value "−1".

In this case, the low pressure determining unit 130 does not determine that two wheels (the front right wheel FR and the rear right wheel RR) are at a low pressure (a position of the low pressure wheel is FR-RR) in accordance with the logic combining equation in which an error is incurred. The low pressure determining unit 130 determines that three wheels (the front left wheel FL, the front right wheel FR, and the rear right wheel RR are at a low pressure (a position of the low pressure wheel is FR-RR).

Therefore, the low pressure determining unit 130 generates a false alarm or an erroneous alarm for a situation where three wheels are at a low pressure, rather than a situation where two wheels are at a low pressure.

As described with reference to FIGS. 1 to 6, DEL_XX values which are radius analysis values calculated in the radius analysis unit 110 are different in a case when one wheel and three wheels are at a low pressure and a case when two wheels are at a low pressure.

For example, when it is assumed that a size of the radius analysis value changing when one wheel and three wheels are at a low pressure is 1, a size of the radius analysis value changing when two wheels are at a low pressure is approximately 2.

In this case, when it is assumed that the low pressure determining unit 130 determines a low pressure using the same critical value for all of one wheel, two wheels, and three wheels, a size of a range where the radius analysis values vary may be different from each other depending on the disturbance and the road condition.

When a specific wheel is at a low pressure and the radius analysis value needs to be smaller than the critical value, the radius analysis value may exceed the critical value. Specifically, when two wheels are at a low pressure, a logic value needs to be "0", but may be recognized as "1" or "−1."

Therefore, the low pressure determining unit 130 generates false alarm or erroneous alarm. Therefore, the low pressure determining unit 130 according to an exemplary embodiment of the present invention, applies two different critical values to a situation where one and three wheels are at the low pressure and a situation when two wheels are at a low pressure, thereby increasing a reliability of detecting a low pressure.

As described with reference to FIGS. 1 to 5, the present invention may induce the tire characteristic using a correlation of the added mass of the vehicle and a torque regression equation.

Specifically, the present invention calculates a correlation between a gradient of a regression equation for a torque of a vehicle and a front and rear radius analysis value DEL_FR and a gradient of a regression equation for an added mass of the vehicle and the front and rear radius analysis value DEL_FR to estimate a changed amount of the front and rear radius analysis value DEL_FR when a vehicle is being driven.

The present invention may compensate the front and rear radius analysis value DEL_FR using a compensation value of the front and rear radius analysis value DEL_FR by the change of the mass of the vehicle.

The present invention searches a tire using a gradient of a regression equation for the front and rear radius analysis value DEL_FR and a torque and a gradient of a regression equation for the front and rear radius analysis value DEL_FR and a yaw rate and determines a low pressure using a low pressure reference line of the searched tire.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A tire pressure monitoring apparatus for monitoring a low pressure of a tire of a vehicle, the apparatus comprising:
   a wheel velocity sensor mounted on each wheel of wheels of the vehicle, wherein the wheel velocity sensor detects rotation velocities of each of the wheels of the vehicle and the wheels include a first wheel of the vehicle, a second wheel of the vehicle, a third wheel of the vehicle, and a fourth wheel of the vehicle:
   a radius analyzing unit, the radius analyzing unit receiving one or more wheel velocities of the wheels from the wheel velocity sensor and determining a first radius analysis value using a relative velocity difference of each of the wheels and an average velocity of the wheel velocities of the wheels;
   a critical value setting unit, the critical value setting unit comparing the first radius analysis value with a predetermined determination reference value and providing one or more critical values based on the first radius analysis value and the predetermined determination reference value,
   wherein the critical value setting unit provides a first analysis sum of the radius analysis values and compares the first analysis sum and the predetermined determination reference value to set the critical values, and/or
   wherein the critical value setting unit provides a second analysis sum of two different radius analysis values without one of the radius analysis values having a largest absolute value among calculated radius analysis values having a second analysis sum and the predetermined determination reference value to set the critical values; and
   a low pressure determining unit, the low pressure determining unit detecting the low pressure of the tire of the vehicle based on the one or more critical values when a pressure of the tire goes below a threshold pressure.

2. The apparatus according to claim 1, further comprising:
   a data storing unit, the data storing unit storing data regarding determining the low pressure of the tire mounted on the vehicle and storing the first radius analysis value, the predetermined determination reference value, and the critical values.

3. The apparatus according to claim 1, wherein when the first analysis sum is smaller than the predetermined determination reference value, the critical value setting unit sets the first analysis sum as a first critical value, and wherein when the first analysis sum is equal to or larger than the predetermined determination reference value, the critical value setting unit sets the first analysis sum as a second critical value, and wherein the first critical value is larger than the second critical value.

4. The apparatus according to claim 1, wherein the critical value setting unit further compares whether the first radius analysis value is larger than a second radius analysis value of the one wheel or the three wheels when the one wheel or the three wheels are at a low pressure,
   the critical value setting unit sets the second radius analysis value as a first critical value when the first radius analysis value is smaller than the second radius analysis value when the one wheel or the three wheels are at a low pressure,
   the critical value setting unit sets the second radius analysis value as a second critical value when the first radius analysis value is equal to or larger than the second radius analysis value when the one wheel or the three wheels are at a low pressure, and
   wherein the first critical value is larger than the second critical value.

5. The apparatus according to claim 1, wherein the low pressure determining unit compares the first radius analysis value and the critical values to change the first radius analysis value to a logic value for a dynamic radius analysis.

6. The apparatus according to claim 1, wherein the low pressure determining unit changes the first radius analysis value to a positive logic value when the first radius analysis value exceeds the critical values, and
   the low pressure determining unit changes the first radius analysis value to a negative logic value, when the first radius analysis value is smaller than a negative value of the critical values, and
   the low pressure determining unit changes the first radius analysis value to a logic value of "0", when an absolute value of the first radius analysis value is smaller than the critical values.

7. A tire pressure monitoring method for monitoring a low pressure of a tire of a vehicle, the method comprising:
   detecting rotation velocities of each of the wheels of the vehicle by a wheel velocity sensor mounted on each wheel of wheels of the vehicle:
   receiving one or more wheel velocities of the wheels from the wheel velocity sensor:
   determining a first radius analysis value using a relative velocity difference of each of the wheels and an average velocity of the wheel velocities of the wheels;
   comparing the first radius analysis value with a predetermined determination reference value and providing one or more critical values based on the first radius analysis value and the predetermined determination reference value,
   wherein a first analysis sum of the radius analysis values are compared to the predetermined determination reference value to set the critical values, and/or
   wherein a second analysis sum of two different radius analysis values without value to set the critical values; and
   detecting the low pressure of the tire of the vehicle based on the critical values when a pressure of the tire goes below a threshold pressure.

8. The method according to claim 7, wherein providing critical values includes:
   comparing the first radius analysis value with the predetermined determination reference value;
   providing the first radius analysis value as a first critical value when the first analysis sum is smaller than the predetermined determination reference value; and providing the first radius analysis value as a second critical value when the first analysis sum is equal to or larger than the predetermined determination reference value, wherein the first critical value is larger than the second critical value.

9. The method according to claim 7, wherein providing critical values includes:

comparing whether the first radius analysis value is larger than a second radius analysis value of one wheel or three wheels when the one wheel or the three wheels are at a low pressure;

setting the second radius analysis value as a first critical value when the first radius analysis value is smaller than the second radius analysis value when the one wheel or the three wheels are at a low pressure; and setting the second radius analysis value as a second critical value when the first radius analysis value is equal to or larger than the second radius analysis value when the one wheel or the three wheels are at a low pressure, wherein the first critical value is larger than the second critical value.

10. The method according to claim 7, wherein the detecting low pressure includes the first radius analysis value and the critical values are compared to change the first radius analysis value to a logic value for a dynamic radius analysis.

11. The method according to claim 7, wherein the detecting low pressure includes:

comparing the first radius analysis value with the critical values;

changing the first radius analysis value to a positive logic value when the first radius analysis value exceeds the critical values;

changing the first radius analysis value to a negative logic value when the first radius analysis value is smaller than a negative value of the critical values; and changing the first radius analysis value to a logic value of "0" when an absolute value of the first radius analysis value is smaller than the critical values.

12. A tire pressure monitoring apparatus for monitoring a low pressure of a tire of a vehicle, the apparatus comprising:

a wheel velocity sensor mounted on each wheel of four wheels of the vehicle, wherein the wheel velocity sensor detects rotation velocities of each of the four wheels of the vehicle, wherein the tire pressure monitoring apparatus is configured to receive one or more wheel velocities of the wheels from the wheel velocity sensor, determine a first radius analysis value using a relative velocity difference of the each wheel of the four wheels and an average velocity of the wheel velocities of the four wheels, compare the first radius analysis value with a predetermined determination reference value and to set one or more critical values based on the first radius analysis value and the predetermined determination reference value, predetermined determination reference value to set the critical values, and/or wherein a second analysis sum of two different radius analysis values without one of the radius analysis values having the largest absolute value are compared to the predetermined determination reference value to set the critical values, and detect the low pressure of the tire of the vehicle based on the one or more critical values when a pressure of the tire goes below a threshold pressure.

13. The apparatus according to claim 12, wherein the tire pressure monitoring apparatus is further configured to set the first analysis sum as a first critical value when the first analysis sum is smaller than the predetermined determination reference value, and set the first analysis sum as a second critical value when the first analysis sum is equal to or larger than the predetermined determination reference value, wherein the first critical value is larger than the second critical value.

14. The apparatus according to claim 12, wherein the tire pressure monitoring apparatus is further configured to compare whether the first radius analysis value is larger than a second radius analysis value of one wheel or three wheels when the one wheel or the three wheels are at a low pressure, set the second radius analysis value as a first critical value when the first radius analysis value is smaller than the second radius analysis value when the one wheel or the three wheels are at a low pressure, and set the second radius analysis value as a second critical value when the first radius analysis value is equal to or larger than the second radius analysis value when the one wheel or the three wheels are at a low pressure, wherein the first critical value is larger than the second critical value.

* * * * *